(12) United States Patent
Brundisini

(10) Patent No.: US 6,763,287 B2
(45) Date of Patent: Jul. 13, 2004

(54) PROGRAMMABLE DECODER FOR IRRIGATION PLANT, PROGRAMMING PROCEDURE FOR SAID DECODER AND CENTRALIZED IRRIGATION PLANT COMPRISING A PLURALITY OF SAID DECODERS

(75) Inventor: Andrea Brundisini, Bologna (IT)

(73) Assignee: Claber S.p.A., Fiume Veneto (IT)

(*) Notice: Subject to any disclaimer, the term of this patent is extended or adjusted under 35 U.S.C. 154(b) by 0 days.

(21) Appl. No.: 10/316,186

(22) Filed: Dec. 11, 2002

(65) Prior Publication Data

US 2003/0135286 A1 Jul. 17, 2003

(30) Foreign Application Priority Data

Dec. 11, 2001 (IT) .................................... MI2001A2596

(51) Int. Cl.[7] ............................ A01G 25/16; G05D 7/00
(52) U.S. Cl. ..................... 700/284; 700/90; 700/282; 239/68; 239/66
(58) Field of Search ........................ 700/90, 275, 282, 700/283, 284; 239/63–70; 137/78.3; 340/310.01

(56) References Cited

U.S. PATENT DOCUMENTS

| | | | | |
|---|---|---|---|---|
| 4,131,882 A | * | 12/1978 | Hollabaugh et al. | ... 340/310.01 |
| 4,176,395 A | | 11/1979 | Evelyn-Veere | |
| 4,760,547 A | * | 7/1988 | Duxbury | ...................... 700/284 |
| 5,048,755 A | * | 9/1991 | Dodds | ......................... 239/64 |
| 5,333,785 A | * | 8/1994 | Dodds et al. | .................. 239/69 |
| 5,651,500 A | * | 7/1997 | Patterson et al. | ............. 239/69 |
| 5,760,706 A | * | 6/1998 | Kiss | ...................... 340/825.69 |
| 5,839,658 A | * | 11/1998 | Sarver | ........................... 239/1 |
| 6,088,621 A | * | 7/2000 | Woytowitz et al. | ........... 700/16 |
| 6,098,898 A | | 8/2000 | Storch | .......................... 239/69 |

FOREIGN PATENT DOCUMENTS

FR  2680629  3/1993

* cited by examiner

Primary Examiner—Jayprakash N. Gandhi
(74) Attorney, Agent, or Firm—Jacobson Holman PLLC

(57) ABSTRACT

The present invention refers a decoder that can be programmed for an irrigation plant, a programming procedure for said decoder and a centralized irrigation plant comprising a plurality of said decoders. The decoder has the characteristic of comprising memorizing means and processing means, said memorizing means and processing means being directly connected to each other, in which said memorizing means can store an identity number and the operating parameters of the decoder itself.

22 Claims, 4 Drawing Sheets

PROGRAMMABLE DECODER FOR IRRIGATION PLANT, PROGRAMMING PROCEDURE FOR SAID DECODER AND CENTRALIZED IRRIGATION PLANT COMPRISING A PLURALITY OF SAID DECODERS

The present invention refers to a programmable decoder for irrigation plant, a programming procedure for said decoder and a centralized irrigation plant comprising a plurality of said decoders.

Automatic irrigation plants controlled by control systems or electronic units for the maintenance of lawns, gardens and other green areas are known.

There is an increasing need of remote controlled irrigation plants, as they enable construction and maintenance cost to be reduced.

These types of irrigation plants are divided into due main categories, that are: a) plants for short and medium distances from the control system, that have a limited number of solenoid valves to control; b) plants for long distances from the control system, that have a high number of solenoid valves to control.

In particular short and long distance irrigation plant control systems are already known, that make use of communication interfaces that enable the control systems programming parameters to be modified.

In addition specific methods for controlling the solenoid valves are already known and among these we can note in particular: a) control system connected by means of electric cables to each single solenoid valve as shown in FIG. 1, in which it can be seen that a control unit 1 is fed by means of a supply line 2 and said control unit 1 is connected at a distance "d", by means of a plurality of electric cables 3, to each single solenoid valve 4, 5, . . . , 6; b) control system connected by means of radio frequency RF to each solenoid valve as shown in FIG. 2, in it can be seen that the control unit 1 is connected to supply line 2 and said control unit 1 is connected by means of an RF transmitting device 14 to respective receiving devices 7 belonging to each single solenoid valve 4, 5, . . . , 6; c) a system in which each solenoid valve is commanded by a control system independently from the other solenoid valves as shown in FIG. 3, in which a plurality of control units 8 can be noted which are fed from respective supplies 2 and said plurality of control units 8 are connected to respective solenoid valves 4, 5, . . . , 6; d) a central control system connected by means of one single pair of cables to all the solenoid valves as shown in FIG. 4, in which it can be seen that a control unit 9 is fed by the supply 2 and said control unit 9 is connected by means of one single pair of cables 10 to a complex of decoders 11, 12, . . . , 13—solenoid valves 15, 16, . . . , 17.

Each of these typologies is particularly adapted for a specific irrigation plant control system that is duly chosen by the engineer of the plant itself.

In specific reference to the case of the above-mentioned system (d), this will be widely used in the case of a long distance irrigation plant with a high number of solenoid valves and with centralized control.

Examples of this plant typology are, for example, irrigation plants along roads, in golf courses, large parks and vast geographic areas.

To command the opening/closing of the solenoid valves in the case of the above-mentioned system (d), it is known that devices such as decoders to encode/decode electrical signals from and to the control unit are added, which however increase installation and maintenance costs.

These decoder systems usually provide for a connection cable from the control system to the decoders themselves of the two-pole or three-pole type having a direct or alternating current input.

In turn the single decoder can drive the solenoid associated to each solenoid valve both in alternating and direct current. If it is usual, considering the very wide use of 24 VAC solenoids in using said typologies of solenoids, the use of a bistable type solenoid results more suitable as it requires power only when it activates and deactivates the valve and not for the entire period that the valve itself is open.

Therefore, using a 24 VAC solenoid the consumption of current needed to supply a plant that uses said solenoids, is considerably higher than that required by a plant that uses bistable type solenoids, under equal conditions.

As a result the section of the connection cable between the control unit and the decoders can be reduced, thus reducing the costs of said plants which for their nature are suitable for long distances between the control unit and the solenoid valves.

In addition the bistable solenoids, exactly for this characteristic of extremely low consumption, are more and more used in the irrigation section thus becoming just as common as the 24 VAC solenoids.

The operating principle of the decoder system is thus to guarantee to each decoder associated to each solenoid valve a minimum charging current for a long time so that once the decoder has been charged, it awaits the command from the control system to open or close the solenoid valve connected to it.

As in an irrigation plant there are hundreds of solenoid valves and the same number of decoders, each decoder is supplied a minimum current so as to guarantee limited losses in tension due to the considerable lengths of the supply cable.

This choice is appropriate as well as the supply cables have a smaller section with a considerate saving in cost.

From the electrical point of view, and still for the saving in cost, a two-pole cable is usually chosen even though this entails greater complexity of drive circuits and decodifying compared to a three-pole cable.

In addition, independently from the type of solenoid used 24 VAC or bistable, it is preferable to use alternating current between the control unit and the decoders so as to avoid problems of corrosion in the cable terminations on each single decoder.

However the present irrigation plants fitted with solenoid valves with decoder do not allow the control of the widest range of conditions linked to the operating of the single solenoid valve—decoder complex.

In addition the present irrigation plants do not permit any malfunctioning of the single decoders and/or solenoid valves to be recognized.

One of the problems that affect the known irrigation systems is that as the bistable solenoid is activated only in correspondence with the opening or closing command of the valve controlled by it, it occurs that, because of an electrical disturbance the command is lost.

This leads to the solenoid valve remaining open instead of closed or vice versa.

One technique used to obviate this problem consists of repeatedly sending the opening or closing command relating to the state of the solenoid valve. This results in all the decoders being addressed sequentially starting from the first to the last and so on, in continuation. In this manner as the number of the controlled decoders increases, the time between two successive addressings of the same decoder also increases.

In addition, at each addressing the decoder not only receives the command relating to its solenoid valve, but also sends to the control unit the state of the sensor associated to it. Therefore we have the situation in which the control unit could, reacting to the information relating to the state of the sensor, open or close the solenoid valve associated to it. This command however could be sent only in correspondence with the successive addressing, with the imaginable consequences and waste of time.

In view of the state of the technique described, the object of the present invention is to produce a centralized irrigation plant with decoders capable of obviating the previously explained problems.

In accordance with the present invention, this object is reached by means of a decoder comprising first terminals suitable for receiving a first electric signal from a control unit, second terminals suitable for exchanging electric signals with detecting means and third terminals suitable for commanding solenoids for activating solenoid valves, said first electric signal being filtered by filtering means and successively rectified by rectifying means and finally decoded by decoding means suitable for generating a second electric signal, characterized in that said decoder comprises also processing means and memorizing means, said processing means being directly connected to said memorizing means, said processing means being suitable for processing said second electric signal so as to exchange electric signals with said second terminals and command said third terminals, and said memorizing means being suitable for memorizing permanently the data present in said first electric signal.

In this manner a centralized irrigation plant can be produced characterized in that it comprises a control unit commanded by a user interface, said control unit being connected by means of an electric supply cable to a plurality of decoders, each of said decoders possessing above mentioned the characteristics.

In accordance with the invention a procedure for programming a decoder in accordance with the above mentioned characteristics has also been executed, characterized in that it provides for a programming step made up of a step sending an electric signal from a user interface by means of suitable connection means, said connection means being fitted with un communication protocol, said communication protocol being made up of a plurality of fields: a) a first field defined by a plurality of characters to feed and synchronize a specific decoder; b) a second field defined by a first preset number of bytes, said bytes being subdivided into a second number of nibbles, in which each nibble is represented by an ASCII character; c) a third field defined by a number representing the hierarchical order of transmission of said bytes.

Thanks to the present invention each decoder can be permanently identified with a reference number.

In addition thanks to the present invention the operating of the solenoid valve—decoder complex can be personalized in function of the specific needs.

In addition thanks to the present invention the operating of the entire irrigation system can be controlled.

In addition thanks to the present invention it is possible to intervene immediately on the programming of the solenoid valve—decoder complex.

The characteristics and advantages of the present invention will be evident from the following detailed description of an embodiment thereof, illustrated as non-limiting example in the attached drawing, in which:

FIG. 4b shows a schematic view of the decoder in FIG. 4a;

FIG. 6b shows the coding of the voltages of the respective coding bits in FIG. 6a.

Figure 1:
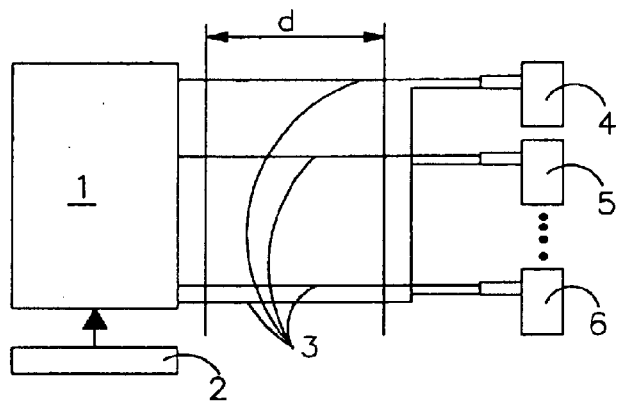
FIG. 1 shows a typology of connection of an irrigation plant according to the known technique.
Figure 2:
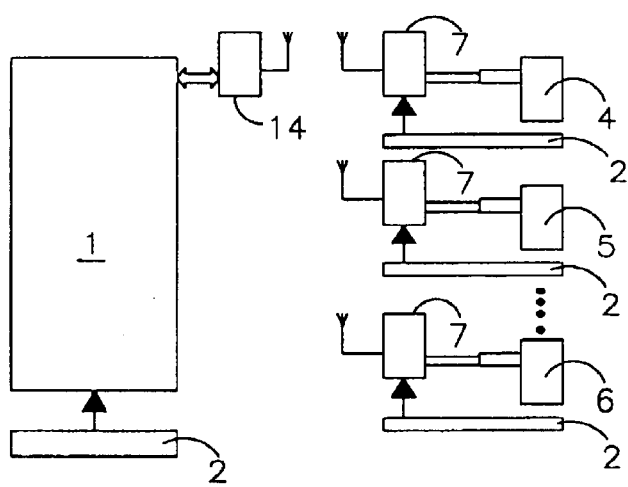
FIG. 2 shows another typology of connection of an irrigation plant according to the known technique.
Figure 3:
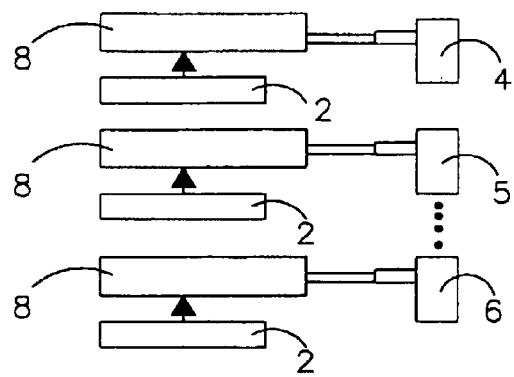
FIG. 3 shows a further typology of connection of an irrigation plant according to the known technique.
Figure 4:
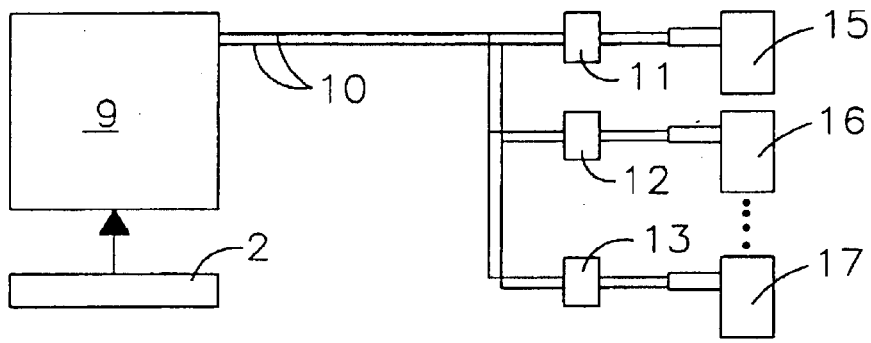
FIG. 4 shows another typology of connection of an irrigation plant according to the known technique.

The present invention referes in particular to an irrigation system equipped with central control unit connected by means of a pair of cables to all the solenoid valves to which a respective decoder is connected, as shown in FIG. 4.

Figure 4A:
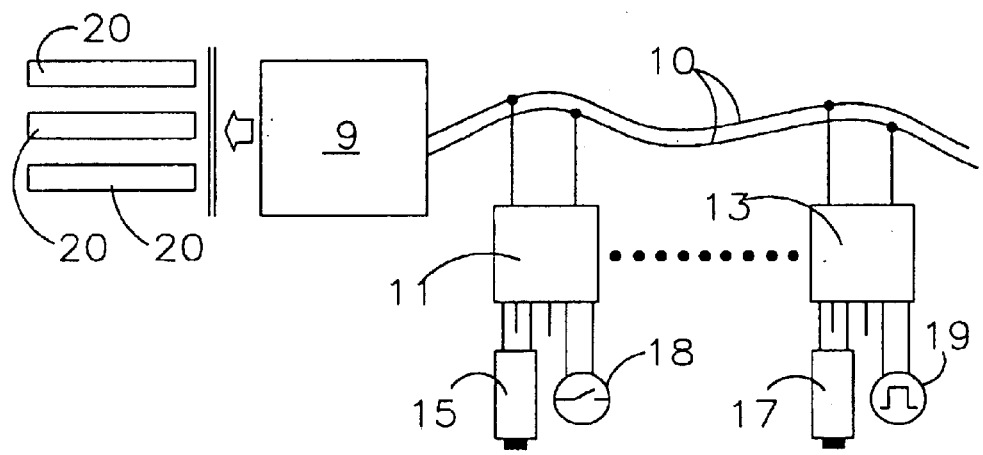
FIG. 4a shows the typology of connection of the plant in FIG. 4 in greater detail.

In fact, with reference to FIG. 4a which illustrates in greater detail the type of connection of the plant of FIG. 4, it can be seen that the control unit 9 provides on one side the connection towards the so-called user interface 20 that can be for example a computer or a modem or another interface device, and on the other side through the electric cable 10, specifically with two poles, towards a respective decoder 11, 12, . . . , 13—solenoid valve 15, 16, . . . , 17 complex.

The supplying of the decoder 11, 12, . . . , 13—solenoid valve 15, 16, . . . , 17 complex preferably comes about by means of the above mentioned electric cable 10 in alternating current.

In particular the decoders 11, . . . , 13 are connected as well as with the respective solenoid valves 15, . . . 17 also with respective sensors 18, . . . , 19.

The sensors 18, . . . , 19 can be of the ON/OFF type, that is sensors of the open/closed type, that is only two possible functioning states, or of the impulse type, that is functioning conditioned upon continuously receiving control signals.

The control unit 9 is a control unit, known in its own right, and can be more or less sophisticated.

In the case of a control unit 9, whose sophistication is minimal, said control unit 9 is capable, for example, of generating the drive impulses of the decoders 11, . . . , 13 but not of managing the sensors 18, . . . , 19, while a more sophisticated control unit 9, on the basis of the irrigation parameters that will be supplied for example by an external personal computer by means of a local or remote connection, can manage the control of the decoders 11, . . . , 13, of the solenoid valves 15, . . . , 17 and of the sensors 18, . . . , 19.

The control unit 9 can function either autonomously (also called stand alone) or in centralized mode.

In the case of autonomous mode a control unit can manage the irrigation plant once it has been suitably configured by means of a connection typology, such as for example, serial cable RS-232, or short range radio frequency connection.

In the case of centralized mode, instead, a control unit can manage the irrigation plant according to the indications received from a remote system by means of a connection typology such as, direct serial communication, or telephonic, or mobile telephonic, or satellite telephonic or by means of radio frequency connection.

The functioning of these control units for the autonomous or centralized management of a irrigation plant is well known by a technician of the sector and therefore will not be illustrated in the present description.

Figure 4B:
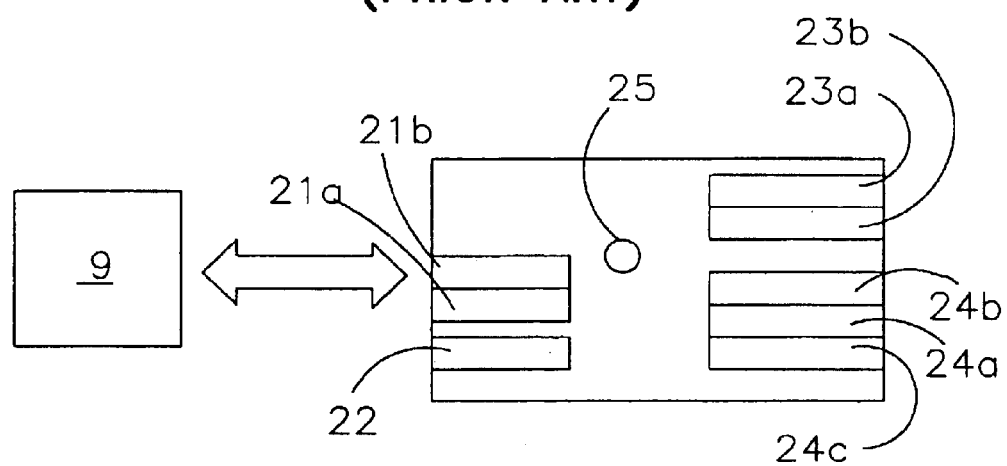

Now in reference to FIG. 4b that illustrates a schematic view of the decoder in FIG. 4a, it can be seen how the decoder 11, for example, possesses a couple of input/output terminals 21a and 21b suitable for receiving said electric cable 10 and a ground terminal 22. In addition, said decoder 11 possesses a further couple of input/output terminals 23a and 23b for sensor 18, for example, and a further plurality of input/output terminals 24a, 24b and 24c suitable for managing the functioning of the solenoid valve 15, by means of the solenoid (not shown in FIG. 4a) connected to it.

In conclusion, decoder 11 also possesses a led indicator 25 suitable for indicating the functionality of the decoder 11 itself.

Figure 5:
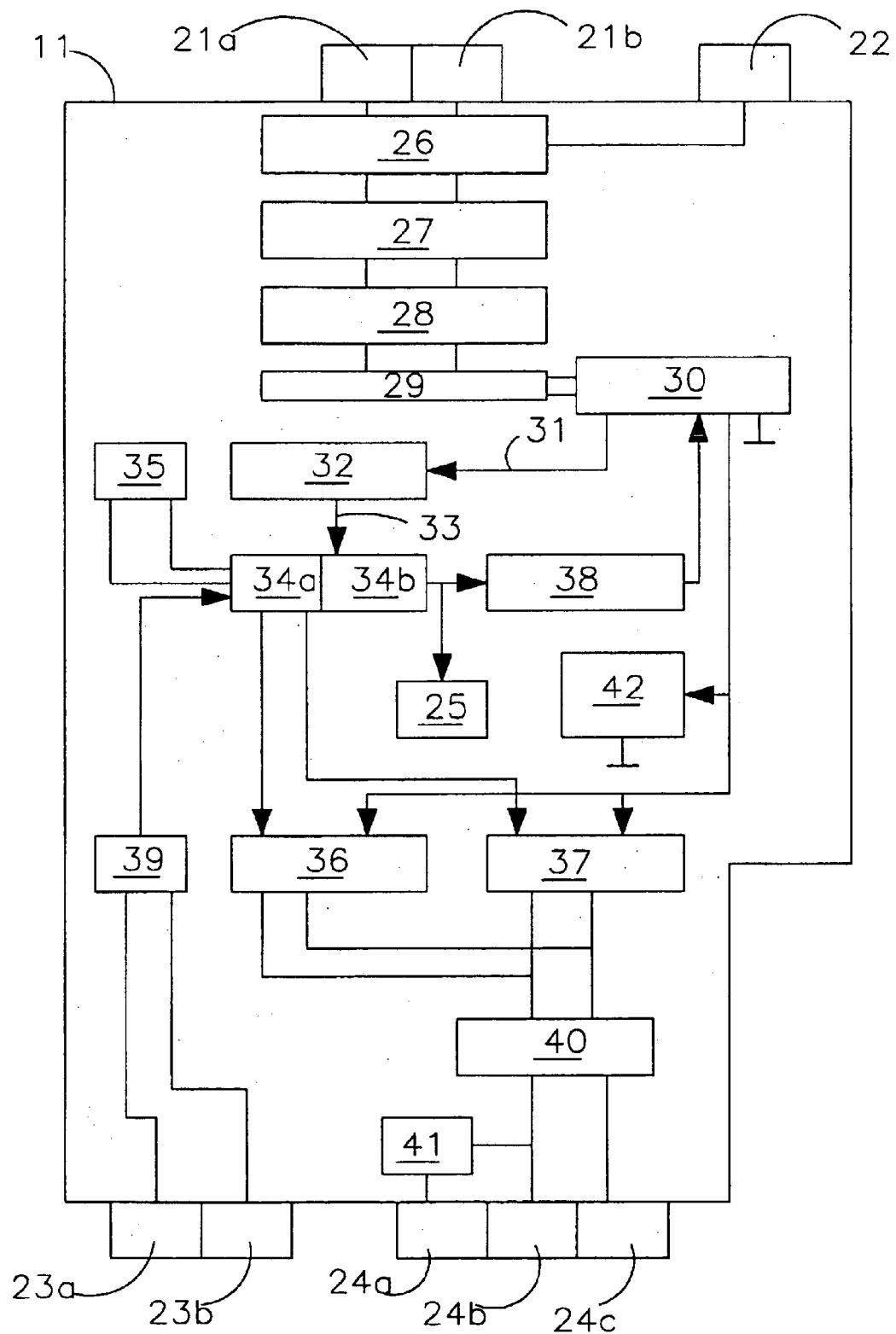
FIG. 5 shows a block diagram of a decoder in accordance with the present invention.

In reference to FIG. 5, in which the block diagram of the decoder 11 is illustrated, a preferred embodiment of the present invention is represented.

In particular the input/output terminals 21a and 21b specific for the bipolar supply electric cable 10, codifying and reading sensors are connected to a series consisting of a first primary protection block 26 against line overvoltage, of a second secondary protection block 27 against line overvoltage, by a third rapid protection block 28 against line overvoltage and by a fourth block 29 suitable for filtering the disturbances on the alternating current present on the electric cables 10.

In addition the primary protection block 26 is connected to the ground terminal 22 of the decoder 11.

The series of blocks 26, 27 and 28 represent the three levels of protection from electric discharges that can be present on the supply cable 10.

In particular on this electric cable 10 there is, for example, an alternating voltage of between 24 and 33 Vac with a typical frequency, for example, of about 2 Hz.

The filtering block 29 is connected to a rectifier circuit 30 constituted for example by a diode bridge. The rectifier circuit 30 places a rectified signal 31 in output, which is the input of a detector circuit 32.

The detector circuit 32 places a signal 33 in output, which results to be the decoder of the signal present on the supply cable 10. This signal 33 is the input of a microcontroller 34.

In this specific embodiment the microcontroller 34 provides internally a real processing unit 34a and a memorization section 34b. This memorization section 34b is made, for example, with non-volatile memories of the EEPROM type.

In another embodiment (not illustrated in said FIG. 5) the EEPROM memory can be external to the microcontroller.

In both cases a direct connection is made between the memorization section 34b and the processing section 34a.

The microcontroller 34 has a working frequency established by a quartz oscillator 35, having an operating frequency for example of f=32,768 KHz.

The microcontroller 34, in particular, commands directly the led indicator 25, an opening circuit 36 of the solenoid valve (not shown in FIG. 5), a closing circuit 37 of the solenoid valve (not shown in FIG. 5) and a loading circuit 38 of the supply cable 10 for communicating the values detected by the sensor (not shown in FIG. 5).

The microcontroller 34 is, in addition, connected to a reading circuit 39 that in turn is connected with the input 23a and output 23b terminals of the sensor (not shown in FIG. 5).

The opening 36 and closing 37 circuit of the solenoid valve are connected to a protection block 40 against the overvoltage present on the solenoid valve itself. In particular said protection block 40 is connected to the control terminals 24a, 24b and 24c of the solenoid valve (not shown in FIG. 5).

In particular, as an example, terminal 24a represents the medium power terminal of the solenoid valve, while terminal 24b represents the maximum power terminal of the solenoid valve and terminal 24c represents the common terminal of the solenoid valve.

It is to be noted, in fact, how terminal 24a is connected to the opening circuit 36 and closing circuit 37 by means of a further block 41, that acts as reducer of power that can be supplied to the solenoid valve.

A supply circuit 42, connected directly to the diode bridge rectifier circuit 30, supplies the operating voltage to the microcontroller and to the circuits that require regulated voltage.

The opening circuit 36 and closing circuits 37 are supplied both by the supply circuit 42 and by the diode bridge circuit 30.

It is to be noted that, in addition, led 25 enables the correct operating of the decoder 11 itself to be verified in situ, by means of, for example, the intermittent ignition of once or more of led 25 itself.

Essential characteristic of the present invention is the presence of the non-volatile memory of the EEPROM type 34b within the microprocessor 34, which thanks to the presence of the detector circuit 32, having the function of decoding the signal brought by the supply cable 10, has the task of memorizing permanently the identity number and the operating parameters of the decoder 11 inside the memory itself 34b.

To be able to carry out the memorizing operation in the EEPROM memory of said identity number and said operating parameters, the Applicant has discovered to be particularly advantageous to make use of a standard output present in all computers, that is, the serial port complying to the standard RS-232.

Using said port RS-232 and a standard cable as well as software commonly in use, for example Excel and/or HyperTerminal, it is possible to connect to the input terminals 21a and 21b of the decoder 11.

In other words, the line input 21a and 21b of the decoder 11 has been made so that in addition to the signals sent by the control system 9 to the decoder 11, it is also capable of recognizing the signals in output from the port RS-232.

The communication specifications that each decoder 11, . . . , 13 has to be submitted to so that it can be set with the operating parameter are illustrated in the following table 1:

| | |
|---|---|
| Bit per second | 300 |
| Bit of data | 8 |
| Parity | Space |
| Stop Bit | 2 |
| Flow Control | None |

The communication protocol, which results to be an essential characteristic of the present invention, that must exist between serial port RS-232 belonging to a computer (not shown in the figures) and decoder 11, . . . , 13 essentially provides for a first definite step of "start" during which 70 characters are sent by the computer, by means of the RS-232, for example, "A" to feed a specific decoder 11, . . . , 13 and to synchronize the parameters (sent during the following step two) to program; a second step in which the parameters constituted of 16 bytes (1 byte=8 bit) are subdivided into 32 nibbles (1 nibble=4 bit), in which each nibble is represented by an ASCII character in accordance with the following table 2:

| Hex Value | Character | ASCII |
| --- | --- | --- |
| 0 | 0 | 30 |
| 1 | 1 | 31 |
| 2 | 2 | 32 |
| 3 | 3 | 33 |
| 4 | 4 | 34 |
| 5 | 5 | 35 |
| 6 | 6 | 36 |
| 7 | 7 | 37 |
| 8 | 8 | 38 |
| 9 | 9 | 39 |
| A | J | 4A |
| B | K | 4B |
| C | L | 4C |
| D | M | 4D |
| E | N | 4E |
| F | O | 4F |

The transmission of the parameters, previously tabulated, provides, above all, for the less significant nibble of each byte being transmitted (the identification of the bytes is described in the following third step) and then the more significant nibble with the characteristic that each character is transmitted twice consecutively so as to verify that it is correct (for example the sequence ASCII: LL77 corresponds to byte 7C); a third step in which the bytes to transmit are identified with a progressive number from 1 to 16, where number 1 indicates the first byte to be transmitted. A bit corresponds to each byte in accordance with the following table 3:

| | |
| --- | --- |
| Bytes 1–2 | Identity number of the decoder in Hex less one. |
| Byte 3 | Configuration byte defined according to the following table 4. |
| Bytes 4–5–6–7 | Not used, always at zero. |
| Byte 8 | Delayed activation for ON/OFF type sensor in which Min = 1 and Max = 255. |
| Byte 9 | Delayed deactivation for ON/OFF type sensor in which Min = 1 and Max = 255. |
| Byte 10 | Threshold value for determining Overflow sensor impulse type in which Min = 1 and Max = 49. |
| Byte 11–12–13–14–15–16 | Not used, always at zero. |

The bytes 4, 5, 6, 7, 11, 12, 13, 14, 15 and 16 not being used are thus available for implementing further characteristics.

For the definition of the bits of the byte 3 the following table 4 is valid, in which, for example, bit "0" indicates the bit in zero position of the byte 3:

| | | | |
| --- | --- | --- | --- |
| bit "0" | Type of sensor: | "0" for sensor ON/OFF | "1" for impulse sensor |
| bit "1" | Mode of ON/OFF type sensor: | "0" for normally OPEN | "1" for normally CLOSED |
| bit "2" | Type of control on solenoid valve: | "0" for continuous | "1" for change |
| bit "3" | Solenoid valve force because of sensor: | "0" for force OFF | "1" for force ON |
| bit "4" | Management mode of sensor: | "0" for remote | "1" for local |
| bit "5" | Not used | "0" always | |
| bit "6" | Memory of the ON/OFF type sensor: | "0" for NO | "1" for YES |
| bit "7" | Not used | "0" always | |

It is to be noted that the correct programming of the parameters shown before in the EEPROM 34b memory of the decoder 11 is given to the user by means of led 25 flashing for several seconds.

Figure 6A:
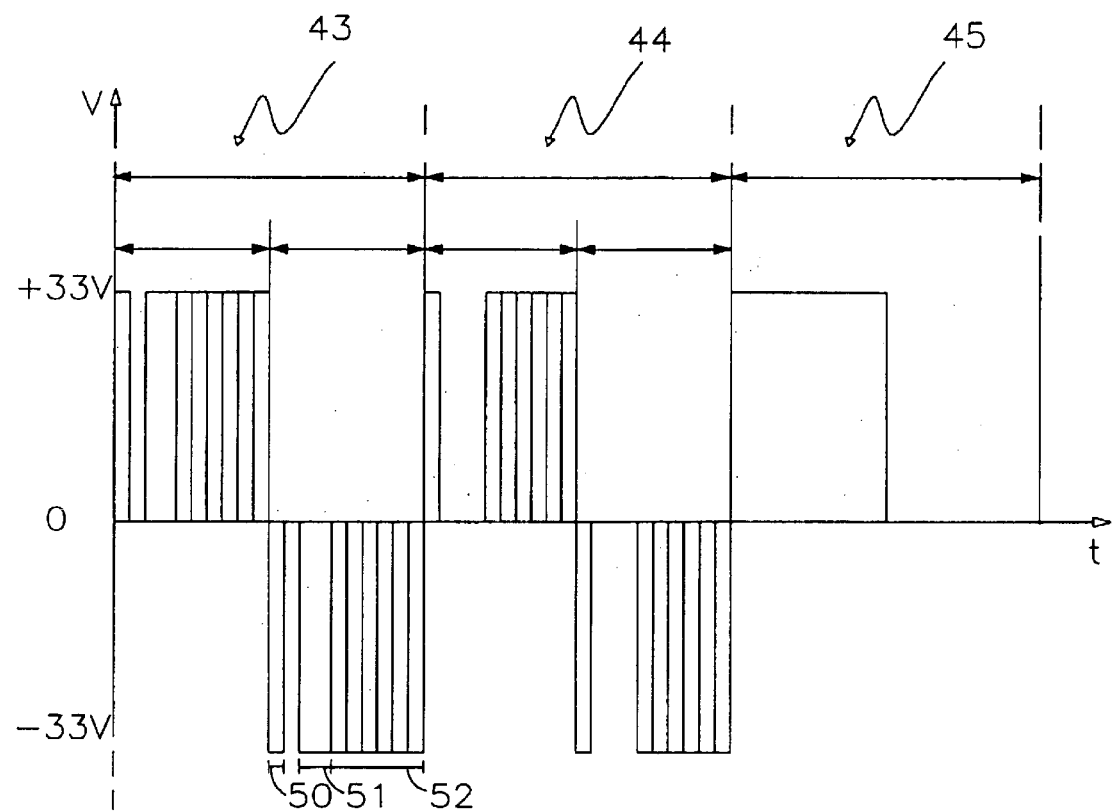
FIG. 6a shows the structure of the coding bit for the decoder illustrated in FIG. 5 in accordance with the present invention.

An axis of ordinates is illustrated in FIG. 6a indicating a voltage expressed in Volt and an axis of abscissas indicating the time expressed in msec; a code 43 of bit "0", that is, Off command for the solenoid valve, another code 44 of the bit "1" that is, On command for the solenoid valve and a further code 45 of the synchronism signal to indicate a new addressing cycle of all the decoders can be noted.

FIG. 6a represents the time coding between the control unit and the decoders. For each decoder there is a command that is carried out by two identical parts but whose polarity is opposite: the first between 0 and +33V, the second between 0 and −33V.

Making reference, for example, to the polarity between 0 and −33V it can be noted that the coding 43 of the bit "0" is composed of a starting impulse, or start, 50, of the duration for example of fifty msec, from the command of ON 51, of the duration for example of fifty msec and of six bits of code 52, of the duration for example of one hundred and fifty msec. Similarly for the coding 44 of the bit "1".

After the coding 45 of the synchronism signal the present invention provides for the transmission of a number "N+3" of bit, where N is the maximum number of decoders present in the irrigation plant, as successively explained.

Figure 6B:
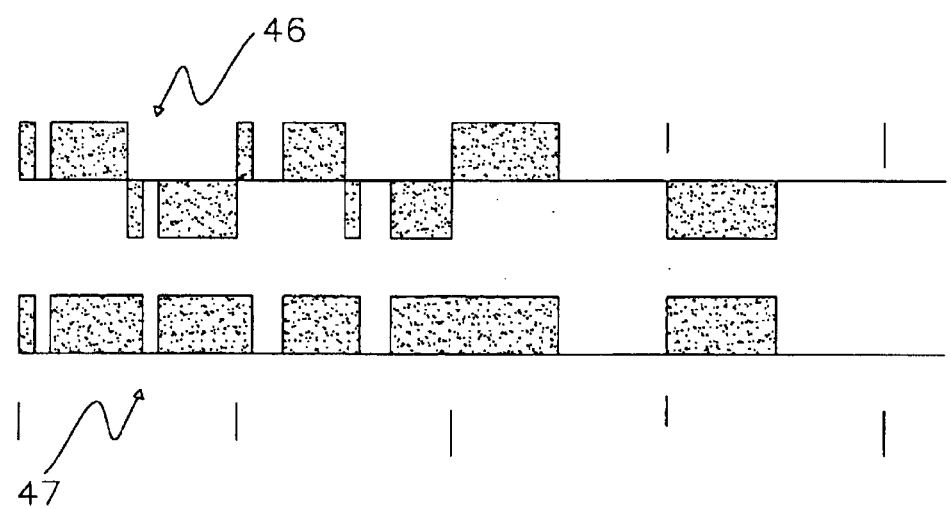

A schematic representation is shown in FIG. 6b of the coding of the voltages of the respective bit of coding in FIG. 6a.

In fact in said FIG. 6b there is a first graph 46 that illustrates the progress of the voltage in output from the line trap 29 of the decoder 11 (therefore signal in alternating voltage), for example, of the sequence bit "0", bit "1" and synchronism signal of FIG. 6a and a second graph 47 that illustrates the progress of the voltage in output from the diode bridge 30 of the decoder 11 (therefore signal in direct voltage), for example, of the same sequence of FIG. 6a.

It is to be noted that in accordance with the present invention, the programming step of the parameters is carried out on the single decoder connected only to the programming computer, and not when it is connected by means of line 10 to the control unit.

The Applicant, to be able to discern between the programming step of the EEPROM memory and the normal operating step of the decoder 11, has therefore developed software (illustrated in the previous tables 2, 3 and 4) inside the microcontroller 34, which following a common RESET operation (that is, for example, when the decoder is fed) is capable of recognizing whether it has to consider the signal at its input of line 21a and 21b as a programming signal of the EEPROM memory or as an operating signal.

It is possible to discern between programming and normal operating in the basis of the time duration (or frequency) of the impulses received.

In other words, after a RESET operation in the case in which the signal to the input of line 21a and 21b has a time duration equal to or higher than a first determined time value, for example 25 msec, it is the case of a normal operating signal, while in the case the time duration of the signal is for example equal to or lower than a second determined time value, for example 18 msec, it is the case of a signal of programming the EEPROM memory.

This can be obtained by increasing the transmission speed of the serial port RS-232, in compatibility with the working frequency of the microcontroller 34 set by the oscillator circuit 35.

The characteristic of being able to store an identity code in the EEPROM memory, that is an identification number belonging exclusively to the decoder 11, with the presence of the sensor 18, enables the central control unit 9 to monitor the operating state of the plant shown in its complex in FIG. 4.

In fact, as each decoder 11, . . . , 13 transmits a value corresponding to the operating start of its own sensor 18 to the central control unit 9, the central control unit 9 can know at any time if said decoders 11, . . . , 13 provided for on the line 10 are operating or not.

In particular, in this specific embodiment, the decoder 11, for example, transmits six-bit digital information. Nevertheless the decoder 11 always transmits a digital number of between zero and sixty-two (being $2^6$=64) thus guaranteeing the presence of at least one binary zero in case the operating is correct, while the absence of said decoder 11 or its malfunctioning will be recognized by the central control unit 9 because the value received does not have at least one binary zero, and that is the maximum value sixty-three.

In fact the binary number sixty-three is the only digital number with six bits not to have any binary zero.

As previously mentioned, the decoder 11 provides for the possibility of controlling a sensor 18 by means of input terminals 23a and output terminals 23b and said sensor can be the ON/OFF type or the impulse type.

Thanks to the communication protocol described in the previous table 2, 3, and 4, the software of the microcontroller 34 can be personalized so that the microcontroller 34 of the decoder 11 can recognize the typology of the sensor connected to it.

In addition the software of the microcontroller 34 can be personalized so that the microcontroller 34 of the decoder 11 can recognize the typology of the sensor ON/OFF normally open or normally closed.

The programming of the microcontroller 34 provides for the microcontroller 34 itself being capable of inserting a programmable delay, for example, between 1 and 255 seconds between the moment in which the ON/OFF type sensor changes state and the moment in which the new state of the ON/OFF type sensor is recognized.

The programming of the microcontroller 34, in addition, provides for the microcontroller 34 itself being capable of setting two different delays of checking the ON/OFF type sensor, that is one for passing from the active state ON to the OFF state and the other for passing in the opposite direction, that is from OFF to ON.

The state of the sensor 18, . . . , 19 of each decoder 11, . . . , 13 is continually monitored by the decoder 11, . . . , 13 which notifies the control unit 9 of it by means of a six bit digital signal, in accordance with what was previously shown in FIG. 6a.

The notification of the state of the sensor 18, . . . , 19 comes about however only once every addressing cycle (also called command repeat period) of the decoders 11, . . . , 13.

In fact defining as bit one the first bit after the synchronism signal, the decoder number "N" transmits the state of the sensor associated to it to the central control unit 9 in correspondence with the bit "N", but interprets the activation and/or turning off command of its solenoid valve in correspondence with the bit "N+2" and acts on its solenoid valve during the bit "N+3", as will appear clear in a following example.

Therefore we have as coding of the state of the sensors 18, . . . , 19 the following classification: a) sensor OFF corresponds to a binary code sixty-two; b) sensor ON corresponds to a binary code sixty-one; c) sensor OFF but ON during the interval between two successive communications corresponds to binary code sixty.

In the case the decoder 11 itself recognizes the impulse sensor connected to it, the number of impulses received between two successive communications of the state of the sensor 18 is transmitted to the control unit 9, said number of impulses being between zero and fifty, zeroing its internal counter every time, if the count number is less than or equal to fifty.

If the count number exceeds fifty, the decoder 11 transmits a so-called "sensor code" to the control unit 9 equal to fifty-one, subtracting just the value fifty from the value of its internal counter so as to permit its internal counter to totalize the number of impulses, guaranteeing, in this manner, that the control unit 9 doe not lose any count.

On the basis of what has been shown in the previous tables 2, 3 and 4, the decoder 11, can transmit the data relating to the state of the sensor present at terminals 23a and 23b to the control unit 9, or, as well as this, the decoder 11 itself can make the decision autonomously to act on its own solenoid valve 15 (that is open or close said solenoid valve), by means of special terminals 24a, 24b and 24c, in function of particular conditions previously specified to decoder 11.

Again in reference to the diagram in FIG. 4, the Applicant has provided, in this specific embodiment, for a control of four hundred and sixty solenoid valves on a single supply line 10, with the possibility of addressing each decoder (totaling four hundred and sixty) once every four minutes (that is for a period of repeating the command equal to four minutes), but the Applicant has also provided for a typology of plant (not shown in FIG. 4) which, for example, provides for the control of four hundred and sixty solenoid valves on four supply lines, with a maximum of one hundred and fifteen decoders per line, with the possibility of addressing each single decoder once every minute (that is for a command repetition period equal to one minute).

To obtain this, the present embodiment provides for the irrigation plant to be set up so as to have four separate lines to enable a more rapid "command repetition period" of the state of the solenoid valve, at the same time managing to control a high number of solenoid valves. In this case the control unit will have four line driving modules, one for each line 9.

In another embodiment, in case the "command repetition period" was not important, a control unit with only one driving module of the line 9 could control all the solenoid valves present provided for.

In other words, in case for each decoder 11, . . . , 13 the decision to act on its own solenoid valve 15, . . . , 17 is delegated to the control unit 9, the time between the information on the state of the sensor 18, . . . , 19 is read by the control unit 9 and the transmission of the relative command is at the most four minutes in the single line plant typology (as that in FIG. 4) and one minute in the four line typology. As it could happen however that the sensor changes state immediately after the transmission of the information by the decoder to the control unit, the maximum time between when the sensor actually changes state and when the solenoid valve is commanded, indicated as reaction time, becomes respectively 8 minutes and 2 minutes.

In reality this does not happen and the reaction time becomes actually 4 minutes and 1 minute in the two cases given.

This is due to another important characteristic of the present invention as differently from what happens in the know art sensor 18, . . . , 19 of each decoder 11, . . . , 13 is read by the control unit 9 a second before commanding the relative solenoid valve 15, . . . , 17, enabling immediate intervention on the solenoid valve 15, . . . , 17 itself if there was need by the control unit 9.

In this manner it is possible to accelerate the reply times of the control unit 9 on each decoder 11, . . . , 13 following information received by the associated sensor 18, . . . , 19.

To have more prompt control the Applicant has thus provided for the delay of a second in the transmission of the commands, that is time equal to two bits, in respect of the reading of the sensor 18, . . . , 19 and in addition to activate the solenoid valve 15, . . . , 17 associated to the decoder 11, . . . , 13 during the successive bit to that in which the decoder 11, . . . , 13 itself received the command from the control unit 9.

In other words, to accelerate the reply times the Applicant has provided for the addition of three further bits to the maximum number of decoders present on the irrigation plant, as previously explained.

As a further example, if it is considered that the control unit 9 codifies the bit "N", then the decoder "N−3" carries out the command received, the decoder "N−2" reads the command received and the decoder "N" replies with the state of its sensor, where "N−3" is the overall number of decoders present in the irrigation plant.

In this manner the control unit 9 can elaborate the data of the decoder "N" sensor and command the solenoid valve associated to it a second after with a considerable saving in time and prompt adaptation to the data detected by the sensor connected.

On the basis of the tables 2, 3 and 4 previously shown, in particular table 4, the bit in position "4" of the byte three, can delegate the intervention function following a preset state of the sensor to the control unit, remote mode, or to the decoder itself, local mode. In both cases the reaction time is 4 minutes in the case of a single line with 460 decoders and 1 minute in the case of 4 lines with 115 decoders each one.

In addition, on the basis of tables 2, 3 and 4 previously shown, in particular table 4, the bit in position "3" of the byte three, can force the solenoid valve 15, . . . , 17 ON or OFF, in function of the state of a sensor 18, . . . , 19 for example active, every minute for a maximum of one hundred and fifteen decoders per line or every four minutes for a maximum of four hundred and sixty decoders per line.

Still on the basis of tables 2, 3 and 4 previously shown, in particular table 4, the bit in position "6" of the byte three, can force the solenoid valve 15, . . . , 17 ON or OFF, in function of the state of a sensor 18, . . . , 19 which for example, even though it is not active at the time, has been active in the last "command repetition period" just finished.

In conclusion, in the case of an impulse sensor, if the number of counts of the sensor exceeds a set threshold within the "command repetition period", there is the possibility of forcing the solenoid valve ON or OFF within a minute for a maximum of one hundred and fifteen decoders per line or within four minutes for a maximum of four hundred and sixty decoders per line.

In conclusion, provision has been made, in the case of interruption or drop in the present supply or of the command signal of the decoders 11, . . . , 13 on cable 10, for the automatic deactivation of the solenoid valves guaranteeing that there is no solenoid valve open, as provision has been made for the possibility of starting up all the decoders 11, . . . , 13 again by means of interrupting the supply on the electric cable 10 by the control unit 9 in case some decoders 11, . . . , 13 no longer replies to the commands transmitted.

What is claimed is:

1. A decoder comprising first terminals suitable for receiving a first electric signal from a control unit, second terminals suitable for exchanging electric signals with detecting means and third terminals suitable for commanding solenoids for activating solenoid valves, said first electric signal being filtered by filtering means and successively rectified by rectifying means and in conclusion decoded by decoding means suitable for generating a second electric signal, characterized in that said decoder comprises in addition processing means and memorizing means, said processing means being directly connected to said memorizing means, said processing means being suitable for processing said second electric signal so as to exchange electric signals with said second terminals and command said third terminals, and said memorizing means being suitable for memorizing permanently the data present in said first electric signal.

2. The decoder in accordance with claim 1, characterized in that said processing means and said memorizing means are inside a microcontroller.

3. The decoder in accordance with claim 2, characterized in that said microcontroller has an operating frequency set by an oscillator circuit.

4. The decoder in accordance with claim 1, characterized in that said data memorized in said memorizing means are the identification number and the operating parameters of the decoder itself.

5. The decoder in accordance with claim 1, characterized in that said memorizing means are made up of a non-volatile memory of the EEPROM type.

6. The decoder in accordance with claim 1, characterized in that said non-volatile memory of the EEPROM type is updated in case said first electric signal has an operating frequency equal to or less than a preset time value.

7. The decoder in accordance with claim 1, characterized in that said detecting means consists of an ON/OFF or an impulse type sensor.

8. The decoder in accordance with claim 1, characterized in that said filtering means consists of the series of first, second and third circuits of protection from overvoltage and of a filtering circuit of said first electric signal.

9. The decoder in accordance with claim 1, characterized in that said rectifying means consist of a diode bridge-execution rectifier circuit.

10. The decoder in accordance with claim 1, characterized in that said opening/closing means consist of a respective opening circuit and by a closing circuit of said solenoid means.

11. A centralized irrigation plant characterized in that it comprises a control unit commanded by a user interface, said control unit being connected by means of a supply cable to a plurality of decoders, each of said decoders comprising first terminals suitable for receiving a first electric signal from a control unit, second terminals suitable for exchanging electric signals with detecting means and third terminals suitable for commanding solenoids for activating solenoid valves, said first electric signal being filtered by filtering means and successively rectified by rectifying means and in conclusion decoded by decoding means suitable for generating a second electric signal, wherein said decoder comprises in addition processing means and memorizing means, said processing means being directly connected to said memorizing means, said processing means being suitable for processing said second electric signal so as to exchange electric signals with said second terminals and command said third terminals, and said memorizing means being suitable for memorizing permanently the data present in said first electric signal.

12. The centralized irrigation plant in accordance with claim 11, characterized in that each of said plurality of decoders is associated to detection means and to solenoid means for activating solenoid valves.

13. The centralized irrigation plant in accordance with claim 12, characterized in that said user interface enables the configuration of said control unit and the collection of information on the state of each of said decoders by means of suitable connection means.

14. The centralized irrigation plant in accordance with claim 13, characterized in that said user interface provides for autonomous management of said control unit.

15. The centralized irrigation plant in accordance with claim 14, characterized in that said autonomous management comes about by means of said connection means of the serial cable RS-232 type, or by means of connection by short-range radio frequency.

16. The centralized irrigation plant in accordance with claim 13, characterized in that said user interface provides for centralized management of said control unit.

17. The centralized irrigation plant in accordance with claim 16, characterized in that said remote control comes about by means of said connection means of the serial cable RS-232 type, or by means of radio frequency connection, or by means of the telephone network or by means of the mobile telephone line (of the GSM type).

18. The centralized irrigation plant in accordance with claim 12, characterized in that said detection means are an ON/OFF type sensor or an impulse sensor.

19. A procedure for programming a decoder, said decoder comprising first terminals suitable for receiving a first electric signal from a control unit, second terminals suitable for exchanging electric signals with detecting means and third terminals suitable for commanding solenoids for activating solenoid valves, said first electric signal being filtered by filtering means and successively rectified by rectifying means and in conclusion decoded by decoding means suitable for generating a second electric signal, wherein said decoder comprises in addition processing means and memorizing means, said processing means being directly connected to said memorizing means, said processing means being suitable for processing said second electric signal so as to exchange electric signals with said second terminals and command said third terminals, and said memorizing means being suitable for memorizing permanently the data present in said first electric signal, characterized in that said procedure makes provision for a programming step composed of a step of transmission an electric signal by a user interface by means of suitable connection means, said connection means being fitted with a communication protocol, said communication protocol being composed of a plurality of fields:

a) a first field defined by a plurality of characters to supply and synchronize a specific decoder;

b) a second field defined by a first preset number of bytes, said bytes being subdivided into a second number of nibbles, where each nibble is represented by an ASCII character; and c) a third field defined by a number representing the hierarchical order of transmission of said byte.

20. The procedure in accordance with claim 19, characterized in that said ASCII character suitable for representing the nibble of said second field is transmitted twice consecutively.

21. The procedure in accordance with claim 19, characterized in that each of said bytes identifies a specific parameter of programming, such as:

a) identity number of a specific decoder;

b) operating configuration of a specific decoder;

c) activation delay for an ON/OFF type sensor;

d) deactivation delay for an ON/OFF type sensor;

e) threshold value for overflow of an impulsive type sensor.

22. The procedure in accordance with claim 21, characterized in that the byte of the step (b) consists of eight bits, each of which identifies a configuration of a specific decoder, such as:

a) bit in position zero identifies the typology of the sensor associated to said decoder;

b) bit in position one identifies the operating mode of the ON/OFF type sensor associated to said decoder;

c) bit in position two identifies if the solenoid valve associated to said decoder has to be commanded continually or only on the change of the state of the solenoid valve itself;

d) bit in position three identifies the type of forcing of said solenoid valve because of the sensor associated to it;

e) bit in position four identifies if the forcing is managed by the decoder or by the control unit;

f) bit in position six identifies the possibility to act on a past condition of the ON/OFF type sensor.

* * * * *